Oct. 12, 1926.
H. J. MOYER
1,602,443
SEATLESS BLOW-OFF VALVE
Filed May 2, 1924
2 Sheets-Sheet 1
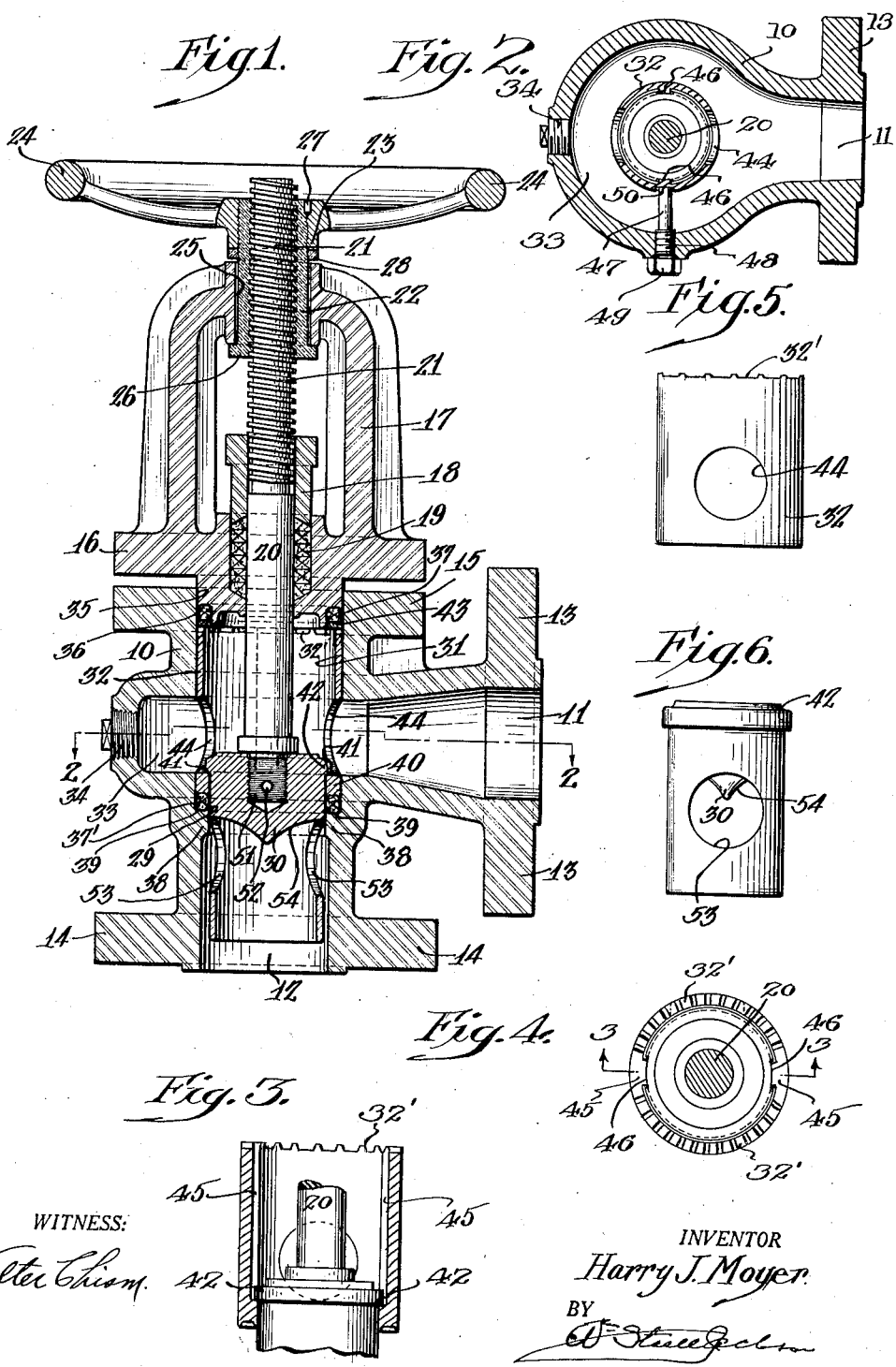
WITNESS:
Walter Chism
INVENTOR
Harry J. Moyer
BY
ATTORNEY Oct. 12, 1926.

H. J. MOYER 1,602,443

SEATLESS BLOW-OFF VALVE

Filed May 2, 1924

WITNESS:

INVENTOR
Harry J. Moyer.
BY

ATTORNEY

Patented Oct. 12, 1926.

1,602,443

UNITED STATES PATENT OFFICE.

HARRY J. MOYER, OF CHICAGO, ILLINOIS.

SEATLESS BLOW-OFF VALVE.

Application filed May 2, 1924. Serial No. 710,562.

My invention relates to valves, and more particularly to blow-off valves of the seatless type in which an apertured sleeve or the end of a tube is withdrawn past the inlet opening to permit discharge.

The main purpose of my invention is to provide a valve adapted to stay tight under extremely high pressures.

A further purpose is to tighten the valve packing according to need at each closure of the valve by means of the hand-wheel.

A further purpose is to apply two packings with tightening means common to both and means for tightening one of them with normal closure of the valve.

A further purpose is to provide for use of the same size of packing at two points of packing application, though the sizes of the parts of the shell packed is different in the two places.

A further purpose is to support the bottom of an upper follower ring against the top of a lower follower ring, providing for engagement between the rings at circumferentially spaced sections and thus facilitating the admission of steam pressure therebetween to press the lower ring downwardly and the upper ring upwardly.

Further purposes will appear in the specification and in the claims.

I have preferred to illustrate my invention in but one main form, shown modified however in one particular, selecting a form which is practical, efficient and thoroughly reliable and which at the same time well illustrates the principles involved.

Figure 1 is a central vertical section through my valve.

Figure 2 is a section of Figure 1 upon line 2—2 thereof and on a reduced scale.

Figure 3 is a section of Figure 4 taken upon the line 3—3.

Figure 4 is a top plan view of the valve element, or plug, and its surrounding sleeve (structure seen in Figure 3).

Figures 5 and 6 are side elevations of the valve sleeve or shell and the valve plug, respectively, seen in Figures 3 and 4.

In the drawings similar numerals indicate like parts.

Figure 7:
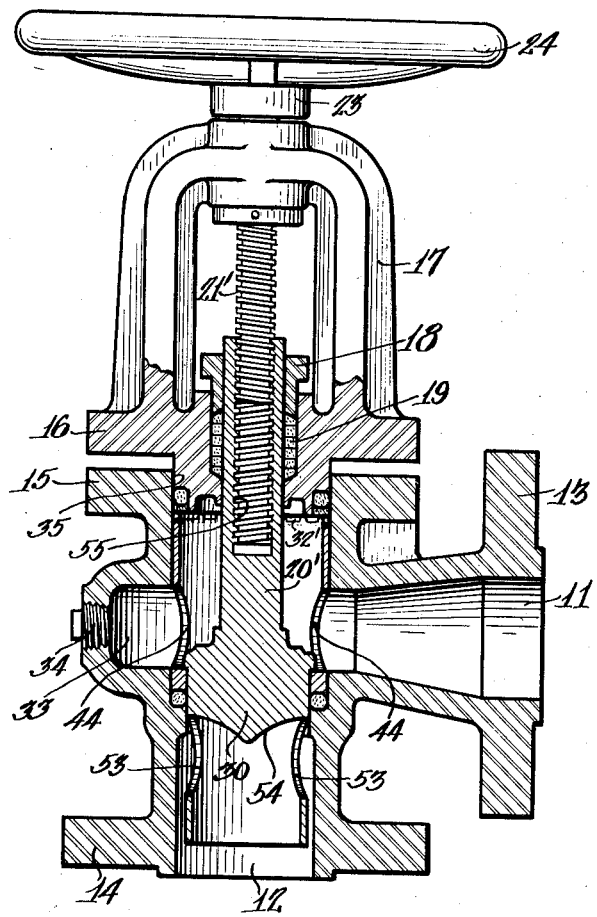
Figure 7 is a side elevation partly in longitudinal section corresponding to Figure 1, but of a construction modified as compared with that figure.

Referring to the drawings and describing in illustration and not in limitation:—

The valve body 10 is provided with the usual inlet 11, outlet 12 and inlet and outlet flanges 13 and 14 as well as top flange 15 with which the flange 16 of the yoke 17 is intended to cooperate, permitting the yoke to be forced down into the valve by means of bolts in the usual manner.

The yoke is provided with the usual gland 18 and packing 19 for stem 20. The stem is threaded at its upper end at 21 through the journal nut 22 fastened in the hub 23 of the handwheel 24. The journal nut is held within opening 25 in the top of the yoke from movement longitudinally by the shoulder 26 upon the nut at the bottom and the wheel hub 23 at the top. The latter is screwed upon the upper part of the nut and keyed to it as at 27. A washer 28 is shown between the wheel-hub and the yoke.

The mechanism shown operates by rotation of the hand-wheel and nut without rotation of the stem; but this illustration will be recognized as one only of a number of operating means for the steam that might be used.

The interior of the body has an intermediate constricted portion at 29, bored for the passage of the movable valve member, or plug 30 and the body is counterbored at 31 to receive the shell 32.

The hollow interior of the body is enlarged laterally at 33 to give free passage around the shell, and for core support during casting, and for convenience of access and cleaning, this space is accessible through the removable plug 34.

The yoke fits at 35 into the bore 31 and its lower part is recessed to provide an annular grooved seat 36 to receive packing 37. Likewise the lower part of the bore 31 is provided with an annular shoulder 38 forming a seat 39 for the lower packing.

The lower end of the shell 32 is internally thickened at 40 to provide a shoulder stop 41 for the head 42 of the valve plug 30 and for wider engagement with the packing held between it and seat 39. The shell or lower follower ring at its upper end presses a follower ring 43 against the packing 37.

The follower ring 43 and the lower end of the shell 32 are preferably of the same radial thickness because it is desirable to use the same moulded packing above and below, making the packing for the two plates interchangeable.

I preferably provide for engagement between the upper and lower follower rings at circumferentially spaced points or sections, admitting the steam in between these points or sections to press the lower follower (or shell) downwardly and the upper follower ring upwardly. In accord with this it will be seen that the shell of Figure 1 is provided with circumferentially spaced recesses 32' around its top, to more fully admit steam pressure between the followers.

The downward holding pressure exerted upon the top of the follower ring 32 may readily be of the order of eight or nine hundred pounds and overcomes the tendency of the shell or lower follower ring to lift during opening of the valve, by reason of the friction between the plug and its packing.

The shell 32 is apertured at 44 and is packed against leakage of fluid upwardly by the packing 37 and downwardly by the packing 37'. Leakage around the stem is prevented by packing 19. The surface of the movable valve plug 30 is engaged by and seals against the packing 37'.

The shell and valve plug are locked from relative turning, as by the guide-wing connection best seen in Figures 3 and 4 where the longitudinal wing ribs 45 of the shell inwardly extend into the guide slots 46 on opposite sides of the head of the plug.

Rotation of the shell within the body of the valve is prevented by a pin 47 threaded into the body at 48, accessible on the outside by a head 49 and fitting into a recess or groove 50 in the outside of the shell.

The movable plug 30 is solid at its upper end at 42 to receive the threaded stem 51 held against rotation by a pin 52. Its head 42 fits and longitudinally slides in the upper portion of the shell and in closure stops against the internal shoulder 41 of the shell. The lower part of the plug fits the bore 29, is hollow and is apertured at 53. The upper end of the hollowed valve is formed as shown at 54 to facilitate flow of fluid through the valve by easy lines.

The valve has not only the usual provision for tightening the packings by screwing down the yoke but permits tightening the packing 37' every time that the valve is closed and to any desired extent by turning the handwheel to force the plug against the shoulder 41 of the shell, forcing the shell down into the lower packing and tightening contact between this packing and the plug circumference.

When the lower packing is compressed by closure of the movable valve member the pressure upon the upper packing is relatively slacked and any desired tightening of the bolts holding the yoke to the valve can be effected easily to take up whatever slack there may be due to use, in the compression of the two packings due to the pressure by the yoke.

It will be noted that the plug when closed is pressed by the steam pressure against the lower follower ring or shell 32, and I provide suitable clearance between the top of the yoke 17 and the washer 28, whereby the lower follower or shell 32 is free to yield or move after the valve has been closed to the steam pressure upon the top of the plug, further tightening the packing 37'.

The construction shown in Figure 7 differs from that in Figure 1 in the particular only that the movable valve member is rigid with a stem member 20' which passes up through the packing as does the stem 20 in Figure 1 but which is moved by a threaded stem member 21' fitting an internal thread 55 within the same portion 20'. The threaded stem portion 21' is operated by the wheel as in the case of the other valve but is rigid with the wheel which as in Figure 1 is protected against longitudinal movement within the yoke.

The form shown in Figure 7 offers some advantage from the standpoint of operation in that it is easier to open though harder to close than the structure of Figure 1. This is because in Figure 7 the area subject to pressure represents a larger percentage of the total cross section of the movable valve member than does the area subject to pressure in Figure 1, the pressure tending to keep the valve closed and which must be overcome being represented by the difference between the cross section of the stem and that of the valve opening.

It will be obvious that my disclosure herein will suggest to others skilled in the art modifications, changes and variations in the valve to secure all or a part of the benefit of my invention without copying it; and it is my purpose to include herein all such other forms as come within the reasonable spirit and scope of my claims.

Having thus described my invention, what I claim as new and desire to secure by Letters Patent is:—

1. In a seatless blow-off valve, a body having a bore and counterbore and a ledge for packing at the bottom of the counterbore, packing therein, a shell fitting the counterbore, engaging the packing and having an interior flange, a ring engaging the upper end of the shell, packing engaged by the ring, a yoke having a ledge engaging the last named packing, a movable valve element sealed by the first-named packing in closed position, axially engaging the flange at closure to tighten the packing, a valve stem for said valve element, packing for the stem and stem lifting and lowering mechanism mounted upon the yoke and engaging the stem to lift and lower it.

2. In a seatless blow-off valve, a body having a bore and counterbore and a ledge at the bottom of the counterbore, packing located against the ledge, a shell fitting the counterbore engaging the packing, a ring engaging the upper end of the shell, other packing engaged by the ring, a yoke having a ledge engaging the other packing, a movable valve element sealed by the first-named packing when in closed position and in closed position axially engaging the shell to tighten the packing, a valve stem for said valve element, packing for the stem and engaging connections between the valve element and the shell preventing rotation of one with respect to the other.

3. In a seatless blow-off valve, a body having a bore and counterbore and a ledge at the bottom of the counterbore, packing located against the ledge, an apertured shell engaging the packing, a ring engaging the upper end of the shell, other packing engaged by the ring, a yoke having a ledge engaging the other packing, a movable valve element sealed by the first-named packing when in closed position and in closed position engaging the shell in an axial direction to tighten the packing, a valve stem for said valve element, packing for the stem and connections between the valve element and the shell permitting movement without relative rotation, and between the body and shell while preventing rotation of the shell.

4. In a blow-off valve, a valve body, a shell therein axially compressed, packing between the shell and body, a yoke fitting into the body, axially compressed packing between the shell and yoke, means for compressing the two packings by movement between the yoke and body, a movable valve element engaging the shell axially to compress the lower packing when in closed position and means for moving the valve element.

5. In a valve, a valve body, an apertured casing therein, packing above and below the casing ends engaging the body, a yoke pressing the casing upon the lower packing, a closure plug circumferentially engaging the lower packing and telescoping in the casing and in the portion of the body beneath the casing and in closure stopping against the casing, and screw means for axially moving the plug.

6. In a valve, a valve plug, a body having an interior shoulder circumferentially fitting the plug, packing upon the shoulder and circumferentially engaging the plug, a follower ring adapted to be downwardly pressed in the packing by steam pressure within the valve, a stop on the ring engaged by the plug and screw means for longitudinally moving the plug.

7. In a valve, a valve plug, a body having an interior shoulder circumferentially fitting the plug, packing upon the shoulder and circumferentially engaging the plug, a follower ring adapted to be downwardly pressed into the packing by steam pressure within the valve, a stop limiting downward motion of the plug with respect to the ring, and screw means having longitudinal play for positioning the plug.

8. In a valve, a valve body having a counterbore, an apertured casing within the counterbore, a yoke upwardly closing the counterbore, a follower ring above and engaging the casing, compressed packing above the follower ring engaging the body and yoke, other compressed packing at the lower end of the counterbore, a closure plug which circumferentially engages the lower packing and telescopes in the casing and in the portion of the body beneath the casing and in closure stopping against the casing, and screw means having longitudinal lost motion for axially moving the plug.

9. In a valve, a valve plug having sealing side portions and means projecting laterally therefrom, a body having an interior shoulder circumferentially fitting the plug, packing upon the shoulder and circumferentially engaging the plug, a follower ring adapted to be downwardly pressed into the packing by steam pressure and to be engaged by the lateral projecting means upon the plug and operating mechanism for positioning the plug.

10. In a valve, a valve plug, a stem therefor, means for moving the stem, a flange upon the plug, a body having an interior shoulder circumferentially fitting the plug, packing upon the shoulder and circumferentially engaging the plug, a follower ring engaging the packing and engaged by the flange, and means movable parallel to the axis of the plug engaging the follower ring to tighten it against the packing.

HARRY J. MOYER.